J. E. BARBER.
SAFETY ATTACHMENT FOR ELEVATORS.
APPLICATION FILED JAN. 28, 1909.
923,105.
Patented May 25, 1909.
3 SHEETS—SHEET 3.
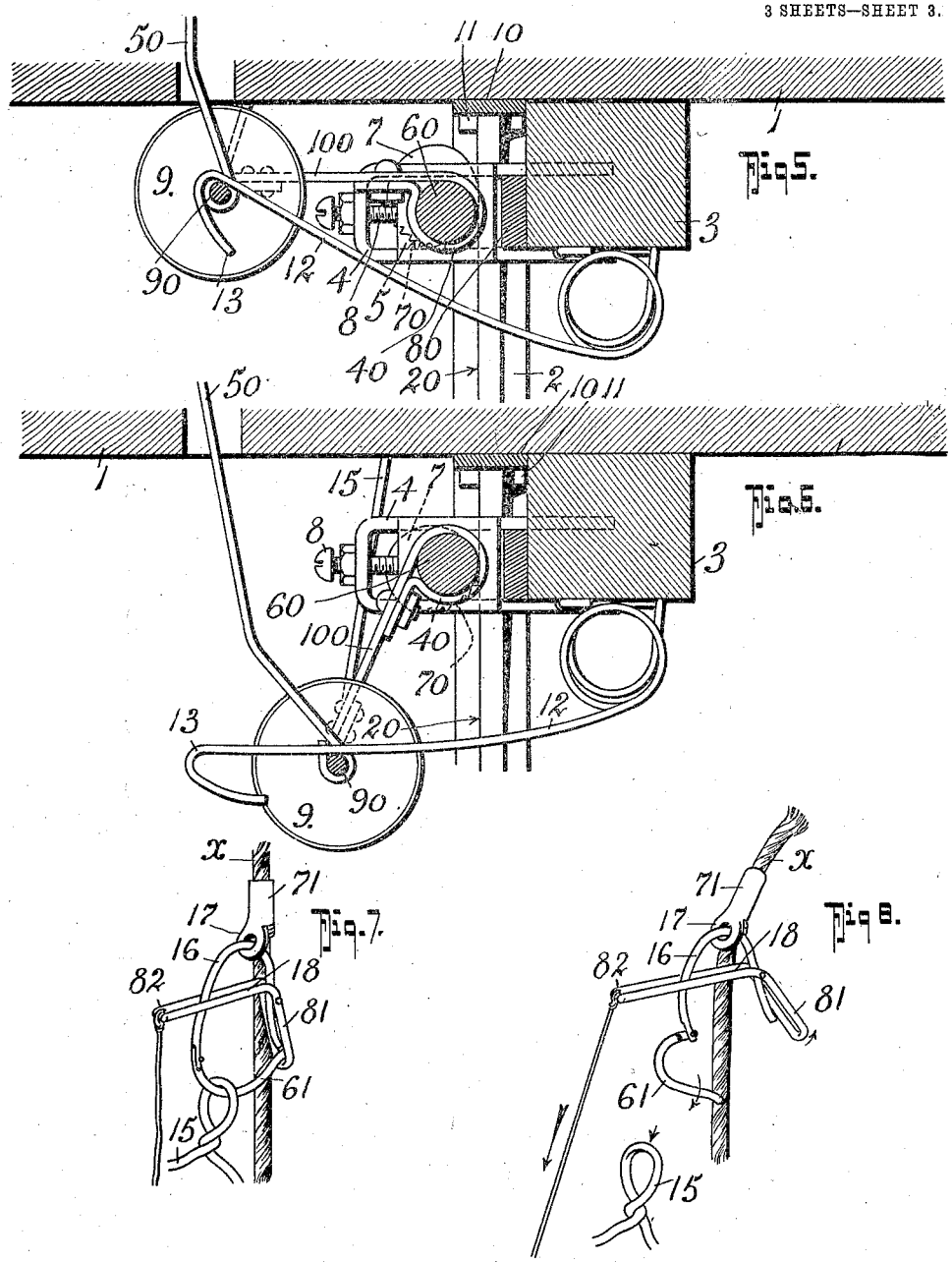
WITNESSES:
John T. Schrott
H. Woodard
INVENTOR
J. E. Barber.
BY
Fred G. Dieterich
ATTORNEYS.

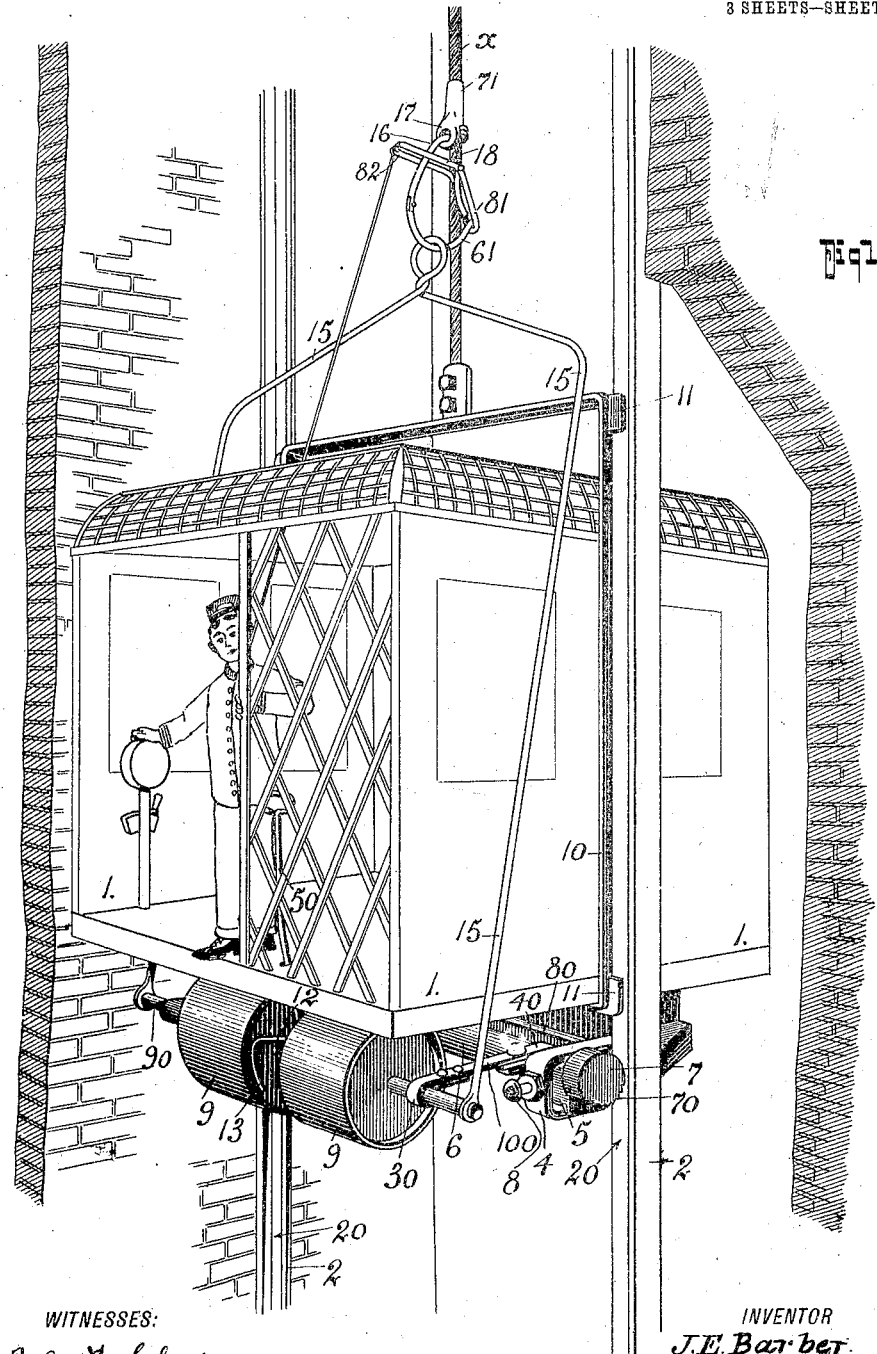

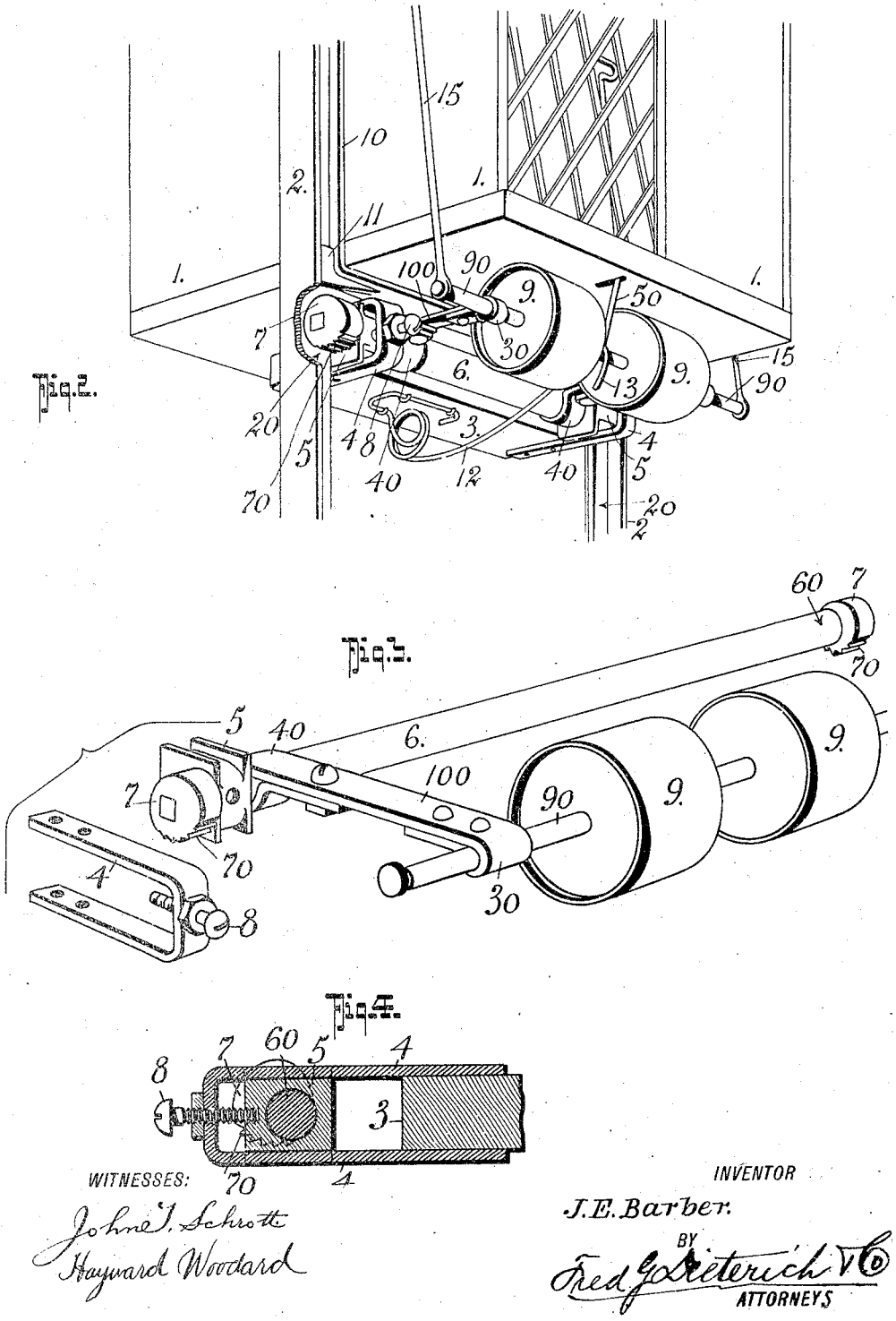

UNITED STATES PATENT OFFICE.

JOHN EDWIN BARBER, OF RITZVILLE, WASHINGTON, ASSIGNOR OF ONE-THIRD TO JOSEPH DEMULLING, OF RITZVILLE, WASHINGTON.

SAFETY ATTACHMENT FOR ELEVATORS.

No. 923,105.  Specification of Letters Patent.  Patented May 25, 1909.

Application filed January 28, 1909. Serial No. 474,819.

*To all whom it may concern:*

Be it known that I, JOHN EDWIN BARBER, residing at Ritzville, in the county of Adams and State of Washington, have invented certain new and useful Improvements in Safety Attachments for Elevators, of which the following is a specification.

This invention, which relates to improved attachments for elevators, is more particularly in the nature of an improved safety brake mechanism for stopping the drop of the elevator platform or cage in case the lifting cable breaks or for any other reason, when the emergency breaking or "arresting" the drop of the cage, is desired.

My invention, in its generic nature, comprehends an improved arrangement of parts that include clutch members adapted for riding upon the side guides for the elevator cage and held out of a clutch engagement therewith so long as the lift cable is taut and that are automatically moved into a clutching contact with the said guides, as the cable breaks, supplemental means being also provided for releasing the clutching mechanism from the normal position, the said supplemental means coöperating with the lift cable, and the said clutching mechanism and controlled by the operator in the elevator cage, whereby the cage can be set to a locked engagement with the guides at the will of the operator.

In its more complete nature, this invention includes a means operable from within the elevator cage for intermittently shifting the clutch mechanism so that the operator can lower the cage by short drop movements without danger of the cage getting away, and in its still more subordinate features, this invention consists in details of construction and peculiar combination of parts, all of which will be hereinafter fully described, specifically pointed out in the appended claims and illustrated in the accompanying drawings, in which:—

Figure 1, is a perspective view of the elevator mechanism with my improvements combined therewith, the parts being in the normal condition. Fig. 2, is a similar view, the cage being viewed from below. Fig. 3, is an enlarged perspective view of the safety brake device detached from the car, one weight supporting arm and the end bearing boxes therefor being omitted, to more clearly illustrate the construction. Fig. 4, is a detail cross section of one of the adjacent end bearing boxes for the clutch shaft. Fig. 5, is a cross section of the parts as in the position shown in Fig. 1. Fig. 6, is a similar view but showing the said parts when in the operative position. Fig. 7, is a detail perspective view of the latch devices that form the part of the supplemental brake mechanism, the same being shown in the locked position. Fig. 8, is a similar view that shows how the said latch devices are tripped.

In the practical application of my invention, no special construction of the elevator cage is required, as the said cage, indicated 1 in the drawing, may be of any well-known form, or when used in mine or freight elevators only the usual platform elevator need be employed.

The cage 1 has the usual framing 10 and a forked extension 11 for straddling the vertical side guides 2 that are mounted in the elevator shaft in any well-known manner.

My improvements are readily applied to the cage 1, which, as shown, has a cross beam 3 on the under side, the opposing ends of which have shoes 80 80 for engaging and traveling against one face of the guides 2 as best shown in Figs. 5 and 6, by reference to which it will be also noticed that U-shaped bearing irons 4—4 are secured to and projected forwardly from the ends of the beam 3 at points adjacent the inner edges of the guides 2. In each of the said bearings 4 is slidably mounted a block 5 and in these blocks are journaled the ends 60—60 of a rocking shaft 6 upon the extreme outer ends of which are integrally or otherwise held clutch members 7—7 which are in the nature of eccentric cams, the clutching faces of which are preferably serrated as at 70 so as to firmly grip the outer face 20 of the guides 2 on which they travel, it being understood that the correlation of the cams and shaft therefor and the guides 2 is such, that when the devices that hold the cam members moved from the locked engagement with the guides 2 are released, the said members 7 automatically clutch and become locked with the said guides 2 to hold the cage to the "caught" position.

To provide for regulating the clutching action of the members 7—7 and to compensate for wear, adjusting screws 8—8 are mounted on the irons 4 for engaging with the blocks 5 so that by adjusting the said screws the bearing blocks 5 can be set to the positions desired.

The shaft 6 is normally locked to release the clutch members 7—7 by the weights 9—9 mounted upon the shaft 90 that is loosely supported in the ends 30—30 of a pair of arms 100 that extend forwardly from and are made fast to the shaft 6, preferably by looping the ends 40 thereof around the shaft 6 and clamping them thereon as clearly shown in Fig. 3.

To assist in rocking the shaft 6 when the weights 9—9 are dropped, in the manner presently explained, a stout spring 12 is secured to the under side of the cross member 3 and has its end projected forwardly and terminating with a loop 13 for engaging with the shaft 90, and in such manner that it also acts as a buffer to prevent unnecessary shock or jar on the car bottom when the weights are lifted back to their elevated or normal position.

So far as described, it is manifest that so long as the weights 9 with the shaft 90 are at their elevated position, the clutch members 7 will ride freely upon the guides 2—2 but as soon as the weight drops, the said members will automatically engage the guides 2 and lock the cage from further descent.

The means employed by me for effecting the release of the shaft 90 and its weights 9 form the essential feature of this invention and these are best shown in Figs. 1, 2, 5 and 6, by reference to which it will be seen that a lifter frame is provided that is formed of a stout metal rod comprising side members 15—15 that straddle the cage and connect to the ends of the shaft 90. The said lifting frame has its upper or cross portion formed with a central loop that hangs upon the latch devices consisting of a stout metal rod member bent to form a U-shaped hanger 16 for engaging the eye portion 17 of a metal sleeve 71 that is fixedly clamped upon the lifting cable x that sustains the cage and which takes over a sheave supported in the top of the elevator shaft and which in practice, passes down to the bottom of the shaft and is actuated in any well-known manner. The latch device also includes a hanger loop or finger 61 that is hingedly joined with one end of the member 16 and has its outer end normally closed up against the other end of the said member 16 by a tripper lock member 18 also formed of stout wire rod bent upon itself to create a loop member 81 and to adapt it for straddling the hanger 16, and said member 18 being bent substantially to a right angle so its free end 82 extends forwardly beyond the member 16, the said member 18 at its angle part being pivotally joined to the hanger 16 and in such manner that when a quick pull strain is applied to the free end 82 the loop 81 will be pulled off the hinged member 61 which then swings down and drops the lifter frame 15 and at the same time releases the weights 9, which through the arms upon which they are supported, rock the shaft 6, and cause the cam clutches to instantly grip and lock against the guides 2 and hold the cage to its arrested position.

By reason of the construction of the parts so far as described, the release of the cage can be readily effected from within the cage by the operator pulling quickly an emergency pull cord (see Figs. 1, 7 and 8) that connects with the free end 82 of the tripping device for the latch 16, on which the lifter frame that holds the clutch or gage mechanism to its normal or releasing position is sustained, it being understood that under normal conditions the lifter cable takes practically all the weight strain of the cage and the attachments, the only strain that is on the latch device being caused by the lift of the weights 9—9 and the tension of the spring 12.

To provide for lowering the cage in the event that the main cable breaks and the said cage is caught between floors or landings a lifting member 50 is utilized, which extends up through the cage floor and has a handle disposed for being conveniently grasped by the elevator operator and which has at its lower end a loop or eye that takes around the shaft 90, it being also readily apparent from the drawings that when the cage is held locked by the weighted cams the operator, by pulling the member 50 upwardly, can easily lift the weights 9 and the shaft 90 so as to rock the shaft 6 sufficiently to intermittently release the grip of the clutches on the guide rails 2 and thereby, by short drops he can lower the cage to the next landing.

While I have found the detailed arrangement of parts shown and described, it is obvious that modifications and changes of the exact details of construction and arrangement of the parts shown may be made without departing from the invention or the scope of the appended claims.

Having thus described my invention, what I claim is:

1. In a mechanism of the character described, the combination with the cage and its guides, of a rock shaft mounted on the bottom of the cage, said shaft having forwardly extended arms, weights carried by said arms, a buffer spring connected to the cage bottom that coacts with the weight carrying arms, a lifter connected with the said weight carrying arms to hold the weights up and the shaft rocked in one direction, guide clutching cams on the shaft, and a latch device for connecting the weight lifter with the cage lifting cable and means operable from within the cage for tripping the said latch.

2. The combination with the elevator cage, the guides therefor and the lifting cable; of a cross beam on the cage that engages the guides at one side, a rock shaft cam clutches on the shaft for engaging the other side of the guides, bearing boxes for the shaft adjustable with respect to the guides, means for automatically rocking the shaft in one direction to cause the cam clutches to engage the guides, and a lifter for rocking the shaft in an opposite direction, connected with the cage lifting cable.

3. A safety brake mechanism for elevators, comprising a cage, a rock shaft carried on the cage cam clutch members on the shaft for engaging the clutch guides, a lifter connected with the lifter cable for rocking the shaft to release the clutch cams, means for rocking the shaft to the clutching position when the cage cable breaks, and a tripper device for releasing the lifter from the lift cable, operable from within the cage.

4. In a safety clutch mechanism for elevators, the combination with the cage, and the guides and the lift cable; of clutch devices mounted on the car for engaging the guides, means connected with the lift cable for holding said devices out of a clutched engagement with the guides, and means for intermittently moving the clutch devices out of engagement with the guides operable from within the cage.

5. The combination with the cage and its guides, and the elevator lifting cable; of a guide engaging clutch mechanism for automatically clutching the guides when the cage drops, means for holding the said mechanism normally out of a clutching position, a latch device for connecting said means with the cage lifting cable, said latch device including a pivoted hanger, and a locking member for holding the hanger to a closed position, and another member that extends into the cage connected with the locking member and adapted when pulled to release the locking member, together with means for intermittently moving the clutch mechanism out of engagement with the guides operable from within the cage for the purposes specified.

6. The combination with the elevator platform and the guides therefor; of a rock shaft mounted on the bottom of the platform, adjustable bearings for said shaft, cam clutches on the ends of the shaft adapted to engage with the platform guides, arms projected outwardly from the rock shaft, another shaft mounted on the outer ends of the arms, weights on the last named shaft, a U-shaped bail whose free ends support the weight shaft and whose upper end extends across the top of the cage, a latch device connected with the lifting cable, said device including a pivoted hanger member for sustaining the U-shaped bail, and means operable from within the cage for tripping the latch device to release the U-shaped hanger therefrom.

JOHN EDWIN BARBER.

Witnesses:
MYRTLE V. EDWARDS,
W. H. MARTIN.